US008885951B1

(12) United States Patent
Cristofano et al.

(10) Patent No.: US 8,885,951 B1
(45) Date of Patent: Nov. 11, 2014

(54) SYSTEM AND METHOD FOR DATA IDENTIFICATION AND EXTRACTION OF FORMS

(71) Applicants: Tony Cristofano, Fairfax, VA (US); Vladimir Laskin, Gaithersburg, MD (US)

(72) Inventors: Tony Cristofano, Fairfax, VA (US); Vladimir Laskin, Gaithersburg, MD (US)

(*) Notice: Subject to any disclaimer, the term of this patent is extended or adjusted under 35 U.S.C. 154(b) by 110 days.

(21) Appl. No.: 13/714,403

(22) Filed: Dec. 14, 2012

(51) Int. Cl.
G06K 9/62 (2006.01)
G06K 9/00 (2006.01)
H04N 1/00 (2006.01)

(52) U.S. Cl.
CPC ........ *G06K 9/00456* (2013.01); *H04N 1/00795* (2013.01)
USPC ............ 382/224; 382/173; 382/190; 382/209

(58) Field of Classification Search
CPC ........... G06K 9/00718; G06K 9/00797; G06F 17/30257; G06F 17/3024; H04N 1/40062; G06T 7/0081; G06T 2207/20144; G06T 7/0083; G06T 2207/10016
USPC ......... 382/173, 175, 179, 190, 209, 218, 224, 382/284, 294, 112; 345/173; 367/63, 73; 250/453.11, 492.1; 358/450; 374/E1.002; 712/15; 715/224, 243; 375/E7.089, E7.161

See application file for complete search history.

(56) References Cited

U.S. PATENT DOCUMENTS

| | | | |
|---|---|---|---|
| 5,937,084 A | 8/1999 | Crabtree et al. | |
| 6,259,826 B1* | 7/2001 | Pollard et al. | 382/284 |
| 7,769,646 B2 | 8/2010 | Wyle | |
| 7,840,891 B1 | 11/2010 | Yu et al. | |
| 7,930,226 B1 | 4/2011 | Quinn et al. | |
| 2004/0036681 A1* | 2/2004 | Kluttz et al. | 345/173 |
| 2007/0033118 A1 | 2/2007 | Hopkinson | |
| 2008/0062472 A1 | 3/2008 | Garg et al. | |
| 2008/0267505 A1 | 10/2008 | Dabet et al. | |
| 2009/0097700 A1 | 4/2009 | Fishback et al. | |
| 2009/0116755 A1 | 5/2009 | Neogi et al. | |
| 2010/0161460 A1 | 6/2010 | Vroom et al. | |
| 2011/0258195 A1 | 10/2011 | Welling et al. | |
| 2012/0027246 A1 | 2/2012 | Tifford et al. | |

* cited by examiner

*Primary Examiner* — Anh Do
(74) *Attorney, Agent, or Firm* — Roylance, Abrams, Berdo and Goodman, LLP

(57) ABSTRACT

A system and method are provided to identify and extract data from data forms by identifying data containment locations on the form, classifying the data containment locations to identify data containment locations of interest, and performing a match between recognition results and a predefined set of known labels or data formats to classify and return a data containment label, coordinates and the recognition value of interest.

20 Claims, 2 Drawing Sheets

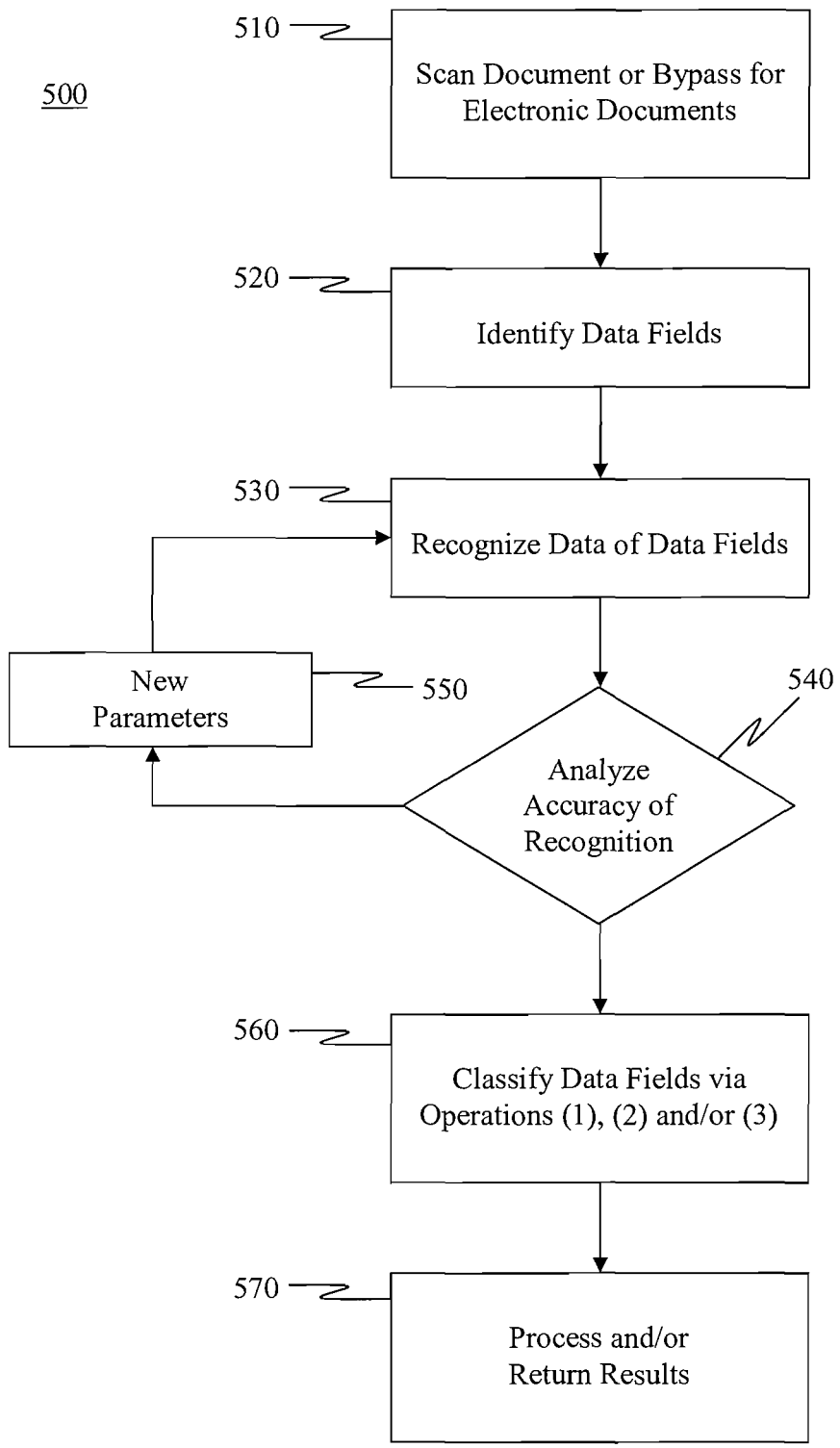

SYSTEM AND METHOD FOR DATA IDENTIFICATION AND EXTRACTION OF FORMS

COPYRIGHT

A portion of the disclosure of this patent document contains material that is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

BACKGROUND OF THE INVENTION

1. Field of the Invention

The present invention relates to a system and method to identify and extract data from data forms by identifying data containment locations on the form, classifying the data containment locations to identify data containment locations of interest, and performing a match between recognition results and a predefined set of known labels or data formats to classify and return a data containment label, coordinates and the recognition value of interest.

2. Description of the Related Art

The automation of data processing has experienced significant growth as technology has developed faster and more accurate hardware and software for both inputting and outputting of data, processing data, and other data handling. However, a significant difficulty encountered with even the most advanced data processing system, is the reliance upon data forms. Such data forms have remained substantially unchanged since conception, and have become very familiar and widely used by everyone. For example, data forms associated with tax payments and tax processing such as W-2 forms and 1099 forms are widely used and processed in large volumes, and typically remain unchanged from one year to the next.

In contrast, data processing systems and technologies advance significantly from one year to the next. Unfortunately, the most sophisticated data processing systems must still be compatible to some degree with these data forms. One such aspect of compatibility is the use and implementation of data processing systems to input data to such forms, capture data from such forms, and otherwise process such forms as desired. For example, a person may complete or submit a completed tax form, such as a W-2 form or a 1099 form, which includes a large amount of data of various levels of importance to a specific data processing operation. The number of completed forms, requiring rapid and accurate processing, can be significant, and conventional data processing may require the manual capture and transfer of data between forms and data processing systems. Therefore, a need exists for a system and method to facilitate such processing at greater speeds, accuracy and requiring less labor. One option is the creation and provision of improved automated data capturing from such forms to increase throughput.

Data extraction improvements have been described in a number of documents, including for example, U.S. Patent Publication No. 2012/0027246 issued to Tifford et al. and U.S. Patent Publication No. 2008/0267505 issued to Dabet et al. which describe a widely used technique for basic data extraction, the use of optical character recognition (OCR). Optical character recognition (OCR) is a technology well known to those skilled in the art for use in text identification and extraction from various documents.

Many other attempts have been made to improve upon such automated data capture of Tifford and Dabet. For example, U.S. Patent Publication No. 2010/0161460 issued to Vroom et al. describes a software module which receives source documents and recognizes or extracts information from the documents and even further, associates the extracted data with particular types or fields of information, for example, fields or locations of a form, such as various tax related forms, e.g., W-2, 1098, 1099. That is, in many such applications using optical character recognition (OCR) as in Tifford and Dabet, data locations must be known or identified in some manner to facilitate the optical character recognition (OCR) operations. Therefore, in these applications, the use of forms which can be readily identified and with known data locations is key for automated data capturing. Accordingly, many further systems are directed to identifying the forms being processed.

For example, U.S. Patent Publication No. 2007/0033118 issued to Hopkinson describes a system and method wherein processed forms are first recognized, and then printed materials of specific regions extracted and used. Identification of the form is performed in some manner is these systems to facilitate the optical character recognition (OCR) operations, such as in U.S. Patent Publication No. 2009/0097700 issued to Fishback et al. The Fishback reference describes a system and method wherein the identity of the form is found using a comparison with a library of forms, and then printed materials of specific regions extracted and used. U.S. Pat. No. 7,930,226 issued to Quinn et al. and U.S. Patent Publication No. 2008/0062472 issued to Garg et al. simply allow a user to identify the form being input and from which data is extracted and used.

In a similar manner, U.S. Pat. No. 7,769,646 issued to Wyle describes a system and method wherein the identity of the form is found using identification codes, and U.S. Pat. No. 5,937,084 issued to Crabtree et al. describes a system and method wherein the identity of the form is found using a comparison with models representative of specific forms. U.S. Patent Publication No. 2011/0258195 issued to Welling et al. and related U.S. Patent Publication No. 2009/0116755 issued to Neogi et al. describe a system and method wherein the identity of the form is found using a comparison of the processed form with expected layouts, and in each, the data of specific regions is extracted and then used. The Welling reference further describes using line intersections to aid in the comparison of the processed form with expected layouts.

Still further, comparisons between the region and text can be used to identify and extract data as described in the system and method of U.S. Pat. No. 7,840,891 issued to Yu et al. The Yu reference describes an element extractor and content engine to access extracted elements, identify a contextual relationship between extracted elements, and relate the extracted elements to create a representation of the form. The entire patent disclosures identified above are hereby incorporated herein by reference.

However, in each of the systems described above, improvements are still needed in the ability to identify data containment locations and narrow data extraction from identified data containment locations to only data of interest. For example, a system and method is needed to scan and identify regions of a form quickly and accurately, identify and classify data of the region, perhaps using values used in the identification of the region of the form.

However, one of many problems associated with such forms and not fully addressed by the above patent disclosures, is that the data is semi-constrained data, i.e. the set of data to capture is known, but the location of that data might vary between forms. For example, due to the number of variations in W-2 forms or 1099 forms, it can be impractical to create individual templates, databases or comparison tools as used in many of the patent disclosures identified above for every variation.

Nonetheless, there are characteristics of W-2 forms and 1099 forms that are sufficiently common to allow their use to address the problems of automated data extraction. First, the forms are typically black and white, and thus, are not affected by any color filtering during operations such as scanning. Second, in most cases, the data on W-2 forms and 1099 forms are machine-printed. Third, the majority of W-2 forms and 1099 forms organize data in boxes created by the intersection of vertical and horizontal lines, and each box typically contains a label identifying the box as well as actual data associated with the label in some manner.

Accordingly, a need exists for a system and method for improving automated data identification and extraction from any number of known data forms by rapidly processing forms, identifying data containment locations on the form, classifying data containment locations on the form and recognizing data in the locations to identify locations and data of interest.

SUMMARY OF THE PRESENT INVENTION

The above and other problems are substantially solved by providing the following embodiments of the present invention. Accordingly, it is an object of embodiments of the present invention to provide a system and method which can recognize, process and extract data from any number of conventional forms, including those presently known or those developed in the future.

To do so, it is another object of embodiments of the present invention to provide a machine (i.e., scanner computer or system), computer code and/or software to recognize, process and extract data from the images of forms, such as federal and/or state tax forms like W2 and 1099 forms.

It is another object of embodiments of the present invention to provide a machine (i.e., scanner computer or system), computer code and/or software to scan forms and generate color and/or black and white images of one or more of the front and back of each form, and store the images and associated metadata to a storage device.

It is another object of embodiments of the present invention to provide a machine (i.e., scanner computer or system), computer code and/or software to apply a series of processing steps to identify the data containment locations or fields on the forms and selectively extract data of identified data containment locations or fields.

It is another object of embodiments of the present invention to provide a machine (i.e., scanner computer or system), computer code and/or software to recognize data in the identifiable data fields and classify each data field by matching recognition results with a predefined set of known labels, matching recognition results with a predefined set of known data field formats, and/or matching the labels of data fields and data field formats, to classify and return the data field label, data field coordinates and the data of the identified data containment location or field.

It is another object of embodiments of the present invention to provide a machine (i.e., scanner computer or system), computer code and/or software to associate the coordinates of where the data was captured and assign a confidence level of how well the system was able to find and\or recognize the data containment locations or fields on the form, and the extracted data of the identified data containment locations or fields.

It is another object of embodiments of the present invention to provide a machine (i.e., scanner computer or system), computer code and/or software to create, store and update metadata files regarding the data containment locations on the form, and the extracted data of the identified data containment locations.

It is another object of embodiments of the present invention to provide a machine (i.e., scanner computer or system), computer code and/or software to, depending upon the accuracy of the data capture, send the data to a data entry operator to perform online data confirmation.

It is another object of embodiments of the present invention to provide a machine (i.e., scanner computer or system), computer code and/or software to upload the data to one or more other subsystems which can perform data mining and data matching to ensure data accuracy and completeness to, for example, ensure that the taxpayer correctly declared all of their income.

In accordance with the above and other objects, exemplary embodiments of the present invention provide a machine comprising one or more of a scanner, computer or system, computer code and/or software, to first process a form or other document to identify data fields or similar visually-identifiable data containment locations on the form, such as those that appear as a line, a rectangle or other box-shaped data field. The exemplary embodiment identifies discernable lines then uses one or more of identified vertical and horizontal lines to locate intersections. The exemplary embodiment then begins to match intersections and define potential data fields in rectangular areas, boxes, or similar visually-identifiable data containment locations on the form.

The exemplary embodiments of the present invention then classify such box-shaped data fields via one or more steps that include analyzing each potential data field with a text recognition engine. The exemplary embodiments then classify each box by performing a match between recognition results and a predefined set of known labels, for example, those labels defined for W-2 forms and 1099 forms, or by performing a match between recognition results and a predefined set of known data formats (i.e., social security number formats), and/or performing a match between the labels and data formats, to classify and return the box label, coordinates and the recognition values of interest.

BRIEF DESCRIPTION OF THE DRAWINGS

The above and other objects, features and advantages of embodiments of the present invention will become more apparent from the following description taken in conjunction with the accompanying drawings, in which:

FIG. 3 is a flow chart of a method illustrating steps in a process according to an exemplary embodiment of the present invention.

Throughout the drawings, like reference numerals will be understood to refer to like parts, components and structures.

DETAILED DESCRIPTION OF EXEMPLARY EMBODIMENTS

Figure 1:
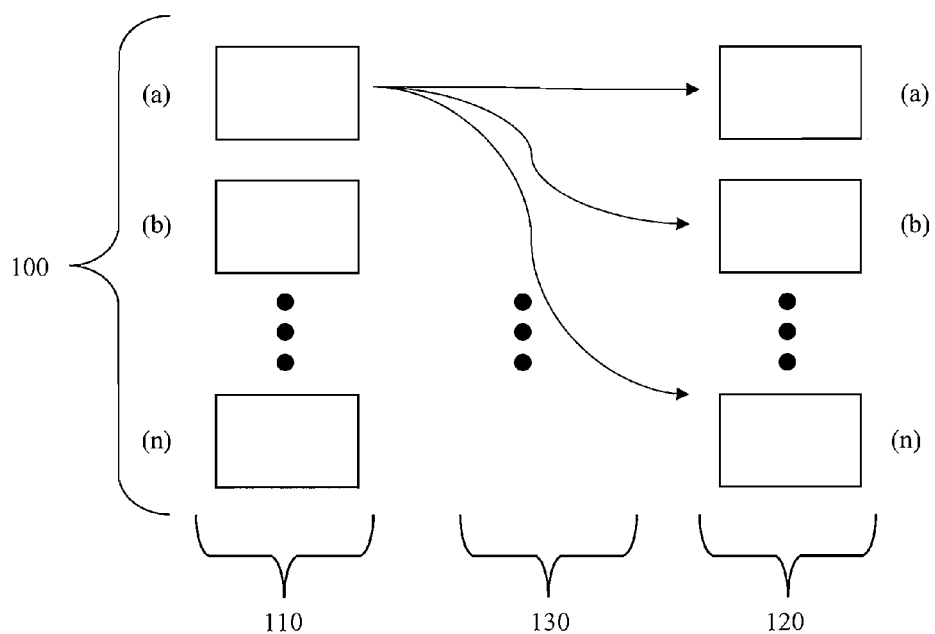
FIG. 1 is block diagram of an exemplary embodiment of the present invention.

Certain exemplary embodiments of the present invention will now be described in greater detail with reference to the accompanying drawings. The matters defined in the description such as detailed constructions and elements are nothing but the ones provided to assist in a comprehensive understanding of the invention. Accordingly, those of ordinary skill in the art will recognize that various changes and modifications of the embodiments described herein can be made without departing from the scope and spirit of the invention. Also, well-known functions or constructions are omitted for clarity and conciseness.

In accordance with an exemplary embodiment of the present invention, a system and method is provided to process and extract data from any number of conventional forms, including those presently known or those developed in the future. In one exemplary embodiment presented for illustration purposes, a system and method is described to process and extract data from forms and more specifically, to process and extract data from W2 forms as well as 1099 and other tax-related forms, as known to those skilled in the art, but not limited thereto. The system and method comprises a machine comprising one or more of a scanner, computer or similar system, computer code and/or software to first process the form or other document to identify data fields or similar visually-identifiable data containment locations on the form that appear as a line, a rectangle or other box-shaped data field. To do this, the exemplary embodiment identifies discernable lines then uses one or more of identified vertical and horizontal lines to locate intersections. The exemplary embodiment then begins to match intersections and define potential data fields in lined areas, rectangular areas, box-shaped areas, or similar visually-identifiable data containment locations on the form.

The exemplary embodiment then classifies such data fields or boxes via one or more steps, including for example, feeding an entire area for each data field or box into a text recognition engine. The exemplary embodiment then classifies each data field or box by performing a match between recognition results and a predefined set of known labels, for example, those labels defined for W-2 forms and 1099 forms, or by performing a match between recognition results and a predefined set of known data formats (i.e., social security number formats), and/or performing a match between the labels and data formats, to classify and return the data field or box label, coordinates and the recognition value of interest.

In an exemplary embodiment, the system and method comprises a machine, computer code and/or software to process the images of a form, such as W2 forms as well as 1099 forms or other similar forms. In an exemplary operation, the forms, with any attachments, are submitted to a central office by a user and upon receipt, the forms are opened and the contents are placed into predetermined batch types depending upon which forms were included with the submission. These batches of paper documents are scanned, for example, using high speed scanners which generate color and/or black and white images of at least one of the front and back of each piece of paper. These images and some associated metadata can be saved to a storage device, or can be processed immediately in the manner described in greater detail below.

In a series of operations, the exemplary machine, computer code and/or software is configured to first determine whether the image created or being accessed is an identifiable form of interest, such as a W2 form or 1099 form. The computer code and/or software can be configured to operate on any number of systems and/or machines, such as a Windows Server, and processes the data or accesses the storage device to process the data. Once the machine, computer code and/or software determines that the image is a form of interest, in this case a W2 form or 1099 form, it applies a series of further processing steps to identify and classify the data fields, data containment locations or similar visually-identifiable data containment locations on the forms, and selectively extract data of the identified fields through any number of techniques, such as Optical Character Recognition (OCR). As known to those skilled in the art, OCR is a mechanical or electronic conversion of scanned images of handwritten, typewritten or printed text into machine-encoded text. Further details of OCR are omitted herein for clarity.

However, as noted in the Background section, one of many problems associated with such forms is that the data of interest is semi-constrained data, i.e. the set of data to capture is known, but the location of that data might vary between forms. For example, there can be a number of variations in W-2 forms or 1099 forms, including size and formatting. Due to these variations in W-2 forms or 1099 forms, it can be impractical to create individual templates, databases or comparison tools as used in many of the patent disclosures identified in the Background Section for every variation.

Nonetheless, there are characteristics of conventional forms such as W-2 forms and 1099 forms that are sufficiently common to allow their use to address the problems of automated data extraction. First, the forms are typically black text on white backgrounds and thus, are not affected by color filtering during scanning. Second, in most cases, the data on W-2 forms and 1099 forms are machine-printed. Third, the majority of W-2 forms and 1099 forms at least organize data in data containment locations (i.e., boxes) created by the intersection of vertical and horizontal lines. Each box also typically contains a label identifying the box as well as actual data, associable with the label. Further, actual data of each box can conform to a known format denoting the data type. Embodiments of the present invention apply such factors in various combinations to improve automated data identification and extraction from the data forms.

Exemplary embodiments of the present invention perform operations based on the idea of preferably narrowing a search down to the area of interest as much as possible before performing data capture to thereby increase system efficiency. The exemplary machine, computer code and/or software first identifies data fields or similar visually-identifiable data containment locations on the form that appear as a line, a rectangle or box-shaped data field. To do this, an executed algorithm of the exemplary machine, computer code and/or software uses one or more of vertical and horizontal lines found on the form, and the intersections thereof, to identify lines, rectangles or box-shaped data fields on the scanned forms. In the exemplary embodiment, boxes are located, but embodiments are not limited thereto, and any number of visually-identifiable data containment locations can be located in a similar manner. In a first step, the executed algorithm builds vertical and/or horizontal lines from a bit-map and then finds the intersections of the vertical and/or horizontal lines. Once intersections are determined the executed algorithm defines rectangular areas (i.e., boxes) on the scanned forms using the identified intersections.

At this point, each set of rectangular areas are identified, and further steps are performed to identify rectangular areas that potentially have data of interest. For example, the rectangular areas can include labels, numeric data, or both labels and numeric data that relate to one another other within the box. By segmenting the entire image area into rectangular boxes through the identification of one or more vertical and horizontal lines and intersections thereof, and that include labels, numeric data, or both labels and numeric data that relate to one another other within the box, the exemplary embodiments of the present invention eliminate problems with matching data and labels when performing generic recognition from the whole image without boxes segmentation.

Once the boxes are found, the executed algorithm classifies such box-shaped data fields via one or more steps that include analyzing each potential data field with a text recognition engine. For example, the algorithm is configured to recognize data in boxes via one or more steps including, feeding an area for each box into a text recognition engine such as Optical Character Recognition (OCR) and classifier to produce multiline results. As known to those skilled in the art, OCR is a mechanical or electronic conversion of scanned images of handwritten, typewritten or printed text into machine-encoded text. Further details of OCR, the text recognition engine, and the classifier are omitted herein for clarity.

To ensure box labels and/or box contents are identified correctly, embodiments of the present invention provide steps to further refine the recognition. For example, box labels or other information can be printed in very small font, and there are some cases when the recognition engine cannot correctly segment characters for identification. For example, it might join a letter from the top line with a letter from the bottom line. To correct this, the executed algorithm goes through recognition results making sure that segmentation is correct by analyzing, for example, character size. If it is determined that the segmentation was not done properly, the algorithm narrows the recognition area down to improve segmentation and thus, improve recognition results. If the algorithm is able to further refine the recognition area, it will perform recognition again.

After the recognition is done, the executed algorithm classifies each box, for example, by performing a match between the recognition results and a predefined set of known labels for the identified form (i.e., the W-2 form and 1099 form), performing a match between the recognition results and a predefined set of known data formats (i.e., social security number formats), and/or performing a match between the labels and data formats, to classify and return the box label, coordinates and the recognition value of interest.

For example, in a first exemplary operation, the executed algorithm can classify each box by performing a match between recognition results and a predefined set of known labels, such as labels stating "Employer's FED ID Number", "Employee's SSA Number", and "Wages, tips, other comp." etc. This can be used by the algorithm to identify the form, identify the box, and/or identify the box contents. These exemplary labels are those found on a W-2 but embodiments are not limited thereto. The predefined set of known labels can be stored on a memory of the exemplary machine, and accessed by the computer code and/or software. Periodic updates can be provided to the database, and/or the database can be updated on an ongoing basis as new labels are detected by the system.

In a second exemplary operation, the executed algorithm can also classify each box by performing a match between recognition results and a predefined set of known data formats (i.e., social security number formats). Specifically, the algorithm can classify each box by performing a match between recognition results and a predefined set of known data formats, such as a format of nine digits "xxx-xx-xxxx" for a Social Security Number. This can be used by the algorithm to identify the form, identify the box, and/or identify the box contents. The predefined set of known data formats can be stored on a memory of the exemplary machine, and accessed by the computer code and/or software. Periodic updates can be provided to the database, and/or the database can be updated on an ongoing basis as new formats are detected by the system.

In a third exemplary operation, the executed algorithm can also classify each box by performing a match between the labels described above (i.e., "Employer's FED ID Number", "Employee's SSA Number", and "Wages, tips, other comp." etc.) and the data formats described above (i.e., xxx-xx-xxxx for a Social Security Number). This can be used by the algorithm to identify the form, identify the box, and/or identify the box contents.

The algorithm is configured to perform one or more of the exemplary operations as needed. For example, the algorithm can perform the first operation and if a satisfactory result is achieved, can move on. If a satisfactory result is not achieved, the algorithm can perform the second operation and so forth. Further, the algorithm can be configured to identify and selectively perform one of the three operations based on a likelihood of success, and bypass the remaining operations. Still further, the user can configure parameters of the comparisons performed above to set degrees of matching between data that indicate a successful comparison. In cases where external databases such as SSN, EIN, or Postal codes are available, the recognition results can be improved further for capturing non-numeric data using such external databases for comparison.

FIG. 1 illustrates an exemplary system to process and extract data from forms and more specifically, to process and extract data from W2 forms as well as 1099 and other tax-related forms, but not limited thereto. The system 100 comprises one or more machines 110(a)-110(n) such as high-speed scanners, computers or similar systems, and having thereon computer code and/or software to process the form, in either hard, soft or electronic form, and generate color and/or black and white images of at least one of the front and back of each piece of paper. The system 100 comprises the one or more scanners, computers or similar systems 110(a)-110(n) in wired or wireless communication with one or more processors 120 via communication links 130. The communication links 130 can be a combination of wireless, LAN, WLAN, ISDN, X.25, DSL, and ATM type networks, for example.

The processors comprise one or more machines 120(a)-120(n) such as computers or similar systems, and having thereon computer code and/or software to store the received images and associated metadata to a storage device, or to process the received images in the manner described in greater detail below.

The machines 110 and processors 120 can comprise a typical combination of hardware and software including system memory, operating system, application programs, graphical user interface (GUI), processor, and storage, which can contain electronic information such as forms, practice aids, titles, data, procedures and the like. The operating system of machines 110 and processors 120 is suitable for use with the functionality described herein, for example, Microsoft Windows Vista (business, enterprise and ultimate editions), Windows 2000 with SP4 or Windows XP Professional with SP2, but are not limited thereto. Also, the operating system of machines 110 and processors 120 can be browser-based and/or can include custom integration with Microsoft Office applications, e.g., Outlook, Word and Excel, but are not limited thereto. Application programs can include, for example, Microsoft Office 2007, Office XP with SP2, or Office 2003 with SP1 applications, but are not limited thereto. The software and related tools, procedures, forms and data used to implement the processes can be accessed via the Internet or can be loaded via CD-ROM or other media or a combination of such means.

The machines 110 can be provided at remote locations, and linked with processors 120 provided at one or more professional services company, or the machines 110 and processors 120 can both be associated with a professional services company, such as an accounting firm, in the business of preparing tax returns or in conducting audits. Such professional services facilities can include a network of machines 110 and processors 120 connected over a LAN, WLAN, Ethernet, token ring, FDDI ring or other communications network infrastructure. Where remotely provided, the machines 110 can be configured to receive processing results from the processors 120 and provide results to a machine user.

To perform exemplary operations, the operating system of the processor 120, can comprise software and related tools, procedures, forms and data used to implement the processes and which can be accessed via the Internet or can be loaded via CD-ROM or other media or a combination of such means. In an exemplary embodiment, each element can be described with a textual input language such as C#, but is not limited thereto. As known to those skilled in the art, C# is a simple, modern, general-purpose, object-oriented programming language.

For example, the following is the pseudo code regarding the classification and recognition of data associated within a W2 or 1099 form. The following is an outline of the exemplary W2Test program on the low level flow on how it classifies and recognizes data associated within a W2 or 1099 form.

```
1. Section creation by finding and creating lines.
    a. ImageTools.RecogBoxes rBoxes - global in Form1
        i. Cleared out never used
    b. ImageTools.DrawBoxes dBoxes - global in Form1
        i. Cleared out and reinstantiated
        ii. Sets parameters to what's in text boxes. Originally loaded w/
            defaults from constructor.
        iii. Call to dBoxes.GetAllLines(sFile) - sFile is a global
            string representing a selected filename in the list of
            images within a selected folder.
            1. Call to GetBorderOffset(ref iOffs) - by reference as this
                value is used in future calls.
                a. It tests if a pixel in top left, top right, bottom left,
                    bottom right is not black, if so it stores that offset.
                    Always taking the lowest.
            2. Call to GetLines2(0, iOffs, ref LinesX) - Finding
                horizontal lines
                a. First param is "iMode" which toggles firstSz =
                    height/width, secondSz=width,height.
                b. firstSz = height
                c. secondSz = width
                d. Nested loop starting from Offset => (height -
                    Offset), height++
                    i. Sub loop Offset => (width - Offset), width++
                        1. It checks the state of the current
                            pixel being black.
                        2. It keeps track of the number of
                            black pixels in a row. If this number
                            exceeds the minimum pixel width
                            input from user or default from
                            constructor it creates a new line
                            object.
                        3. It iterates through until the
                            consistency of a line has been
                            broken, taking into account white
                            pixel drop and then adds this line to
                            the reference list of lines.
            3. 2nd Call to GetLines2(1 iOffs, ref LinesY) - Finding
                vertical lines
                a. firstSz = width
                b. secondSz = height
                c. Nested loop starting from Offset => (width - Offset),
                    width++
                    i. Sub loop Offset => (height - Offset),
                        height++
                        1. It does the same as #2,d,i.
                            a. Checks state of current pixel
                                being black. Keeps track of
```

-continued

```
                                number of black pixels in a
                                row, if this exceeds min
                                pixel width it creates a new
                                line object. Then continues
                                to iterate until it can't find a
                                black pixel anymore and
                                adds this line to the list of
                                lines to return by reference.
            4. Call to GetResLines2(0, blterate_, LinesX, mLinesXX)
                a. The call to GetLines2( ) returns quite a lot of results
                    as images are generally very dirty. This call does
                    quite a lot of manipulation from this list to:
                    i. Joins lines that are close together.
                    ii. Extend lines that have "punctures", could be
                        a dirty image or a page that has physical
                        punctures such as a hole-punch.
                    iii. Only adds lines at the top/bottom of a black
                        area, not the whole area.
                    iv. Only adds lines that are less than a
                        maximum width.
            5. 2nd Call to GetResLines2(1, blterate_, LinesY, mLinesYY)
                a. This does the same thing as the first call, except on
                    the vertical instead of the horizontal.
        6. Creates edge lines.
            a. Iterates through all of the lines and finds:
                i. Furthest horizontal left pixel.
                ii. Furthest horizontal right pixel.
                iii. Furthest vertical top pixel.
                iv. Furthest vertical bottom pixel.
            b. Removes the lines associated with the pixels found
                in #6,a.
            c. Uses the pixels found in #6,a. to create a new edge
                line that extends from:
                i. Offset => iWidth - Offset, and furthest
                    verticals.
                ii. Offset => iHeight - Offset, and furthest
                    horizontals.
        7. Uses FairFax Imaging image editor "AxFImgEdit.dll"
            to iterate through the lines and draw them on the image.
```

Figure 2:
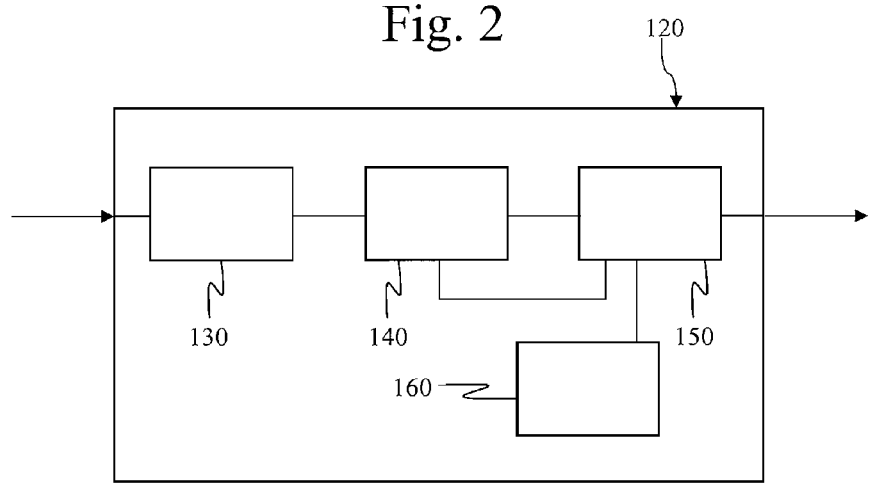
FIG. 2 is block diagram of a processor of FIG. 1 according to an exemplary embodiment of the present invention.

The above and additional pseudo code can be embodied upon a computer-readable medium of the processor of FIG. 2. FIG. 2 is block diagram of a processor 120 according to an exemplary embodiment of the present invention. The processor 120 can comprise a computer-readable medium holding computer-executable instructions that when executed cause at least one computing device to perform necessary calculations.

FIG. 2 is block diagram of a processor 120 according to an exemplary embodiment of the present invention. Each processor comprises at least a data field identifier 130, a recognition engine 140, and a classifier 150. The processor 120 can further comprise one or more of a central processing unit (CPU), microprocessor, graphics processing unit (GPU/VPU), physics processing unit (PPU), digital signal processor, network processor, front end processor, data processor, word processor and audio processor. In an exemplary embodiment, the processor 120 further comprises an arithmetic logic unit (ALU) and a control unit (CU). As known to those skilled in the art, the ALU performs arithmetic and logical operations of the processor, and the CU extracts, decodes and executes instructions, such as those stored in a memory.

The executed algorithm is configured to also associate the coordinates of where the data was captured and assign a confidence level of how well it was able to find and\or recognize the data. All of this information is used to create and update a metadata file stored to a memory of the exemplary machine, and accessed by the computer code and/or software. Depending upon the estimated or determined accuracy of the data capture, the data can be stored to a memory of the exemplary machine or sent to a data entry operator to perform online data confirmation.

If the executed algorithm is able to successfully classify the box, results (i.e., box label, coordinates and the recognition value) are returned. For example, the system and method can provide data including boxes and box labels that were identified, and boxes and box labels that may contain data of interest. The system and method can further provide coordinates of boxes. Finally, the system and method can provide the recognition values, or data, of the box that may be of interest. The system and method can provide any number of additional processing results, such as the comparison used to classify the box. To do so, the exemplary embodiments of the present invention can include a display or printer that can provide such results to a user. The data can also be uploaded to another subsystem which can execute computer code and/or software for data mining and data matching to ensure compliance or other confirmation checks such as, for example, to ensure that the input user, a taxpayer in this example, correctly declared all of their income.

During an exemplary operation, the data field identifier 130 is configured to execute code to first identify data fields or similar visually-identifiable data containment locations on the form, such as those that appear as a line, a rectangle or other box-shaped data field. For the identification of a rectangle or other box-shaped data field, the data field identifier 130 uses one or more of vertical and horizontal lines found on the form, and the intersections thereof, to identify boxes on the scanned forms. In a first step, the data field identifier 130 builds vertical and/or horizontal lines from a bitmap and then finds the intersections of the vertical and/or horizontal lines. Once intersections are determined, the data field identifier 130 defines rectangular areas (i.e., boxes) on the scanned forms using the identified intersections. At this point, each set of rectangular areas are identified, and further steps are performed to identify rectangular areas that potentially have data of interest.

For example, the following is the pseudo code regarding the identification of a rectangle or other box-shaped data field.

```
2. Creation of intersections.
    a. Nested for loop iterating through each horizontal line.
        i. Creates a Drawing.Rectangle object with:
            1. Y attribute set to the y attribute of the line.
            2. X attribute set to the x attribute minus an offset. 0 if
               negative.
            3. Width = Line.X2 – Line.X1 + (2 * Offset)
            4. Height = Line.Y2 – Line.Y1 = 0
        ii. Sub loop iterating through each vertical line, creating another
            Drawing.Rectangle object with:
            1. X attribute set to the x attribute of the line.
            2. Y attribute set to the y attribute minus an offset. 0 if
               negative.
            3. Width = Line.X2 – Line.X1 = 0
            4. Height = Line.Y2 – Line.Y1 + (2 * Offset)
        iii. NOTE: Reasoning behind the offset is: imagine the lowercase "i",
             with a horizontal line running through the dot of the "i". That
             distance between the middle piece and the top piece happens at a
             magnified pixel level. By increasing the length of the line and making
             the starting position earlier there's a greater percentage of the
             intersection occurring. You would rather have more intersections
             than fewer as the next part of the algorithm will use these
             intersections to create sections to analyze text data within them.
        iv. Call to subloopRectangle.Intersect(nestedloopRectangle)
            1. Intersection is determined if the x or y attribute is zero.
        v. If the rectangles intersect the point is added to a global list of
           Point.Point( )
        vi. Global attributes are set based on this newly set list:
            1. DocWidth = List[count – 1].X – List[0].X
            2. DocHeight = List[count – 1].Y – List[0].Y
            3. MaxDocY = List[count – 1].Y
        vii. Uses FairFax Imaging image editor "AxFImgEdit.dll" to clear out the
             image and iterate through the lines and draw them on the image,
             then draws squares for all of the intersection points. Obviously #1,
             the creation of lines must occur before #2, the creation of
             intersections can work.
3. Creation of sections / "boxes".
    a. Use of function IsSegmentFound(mode, lineSegment, List of lines) is used
       quite a lot, defining first:
        i. Iterates through each of the lines within the list and see's if
           IsSegmentInLine(mode, lineSegment, line[i]) returns true.
            1. If the mode is 0 for testing horizontal lines:
                a. Creates a new ImageToolslinePoints object and
                   sets the attributes to:
                    i. X1 = line[i].X1 – Offset
                    ii. X2 = line[i].X2 + Offset
                    iii. Y1 = line[i].Y1
                    iv. Y2 = line[i].Y2
                b. Returns true if:
                    i. lineSegment.Y1 == Y1
                    ii. lineSegment.Y2 == Y2
                    iii. lineSegment.X1 >= X1
                    iv. lineSegment.X2 <= X2
```

-continued v. In other words: if the line[i] it's currently looking at is on the same horizontal position and lies within the vertical position of the line segment.

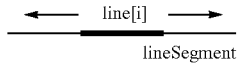

(1)

2. If the mode is 1 for testing vertical lines:
   a. Creates a new ImageTools.LinePoints object and sets the attributes to:
      i. X1 = line[i].X1
      ii. X2 = line[i].X2
      iii. Y1 = line[i].Y1 − Offset
      iv. Y2 = line[i].Y2 + Offset
   b. Returns true if:
      i. lineSegment.X1 == X1
      ii. lineSegment.X2 == X2
      iii. lineSegment.Y1 >= Y1
      iv. lineSegment.Y2 <= Y2
      v. In other words: if the line[i] it's currently looking at is on the same vertical position and lies within the horizontal position of the line segment.

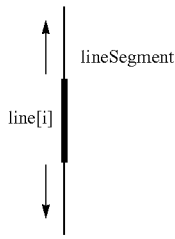

(2)

b. Loop through each intersection i = 0, set point1 = List[i], i++
   i. Loop through each intersection ii = i + 1, set point 2 = list[ii], ii++
      1. If the point1.Y != point2.Y break out to #3.b
         a. In other words they have to be on the same horizontal
      2. Set the attributes to an ImagePoints.LinePoints object to:
         a. Line.X1 = point1.X
         b. Line.X2 = point2.X
         c. Line.Y1 = point1.Y
         d. Line.Y2 = point2.Y
      3. Call to IsLineSegment(0, Line, LinesX), If a line segment on the horizontal is not found break out of this iteration to #3.b, note (1)
      4. Loop through each intersection j = i + 2, j++
         a. If point1.X != List[j].X skip over this iteration to #3.b.4 and look at other lines containing the same horizontal value.
         b. Sets the attributes of the same line object:
            i. Line.X1 = point1.X
            ii. Line.X2 = point1.X
            iii. Line.Y1 = point1.Y
            iv. Line.Y2 = List[j].Y
         c. Call to IsLineSegment(1, Line, LinesY), If a line segment is not found using the intersections x and the list of lines Y break to #3.b.4

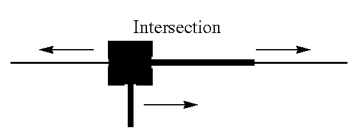

(3)

-continued

```
        d. Loop through each intersection k = j + 1, k++(3)
            i. If point2.X != List[k].X skip over this iteration
               to #3.b.4.d and look at other lines that have
               a different horizontal value.
           ii. Sets the attributes of the same line object:
                 1. Line.X1 = List[j].X
                 2. Line.X2 = List[k].X
                 3. Line.Y1 = List[j].Y
                 4. Line.Y2 = List[k].Y
          iii. Call to IsLineSegment(0, Line, LinesX), if a
               line segment is not found break out to
               #3.b.4
```

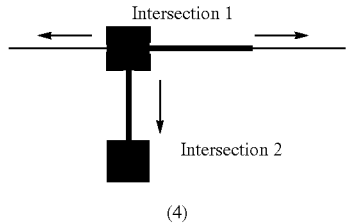

(4)

```
           iv. Sets the attributes of the same line object:
                 1. Line.X1 = point2.X
                 2. Line.X2 = point2.X
                 3. Line.Y1 = point2.Y
                 4. Line.Y2 = List[k].Y
            v. Call to IsLineSegment(1, Line, LinesY), if a
               line segment is not found break out to
               #3.b.4
```

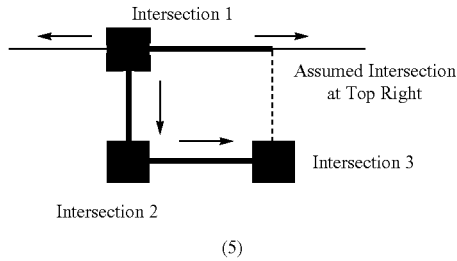

(5)

```
           vi. Creates a new ImageTools.LinePoints object
               and sets the attributes to:
                 1. Box.X1 = pt1.X
                 2. Box.Y1 = pt1.Y
                 3. Box.X2 = List[k].X
                 4. Box.Y2 = List[k].Y
          vii. Adds the newly created object to the global
               List of LinePoints.
         viii. Sets the local Boolean to true to break out
               of nested for loops.
           ix. Breaks out to #3.b.4
        5. If Boolean is true break to #3.b.
    c. If Boolean is true break out of main for loop.
    d. If the first box covers most of the image remove it as it was created by the
       edge lines
    e. Iterate through each box
         i. If the width/height of the box is greater than Offset * 2
              1. Shrink the box in by offset in order to only read within the
                 line segments
    f. Uses FairFax Imaging image editor "AxFImgEdit.dll" to clear out the image
       and iterate through the lines and draw them on the image, then draws
       squares for all of the intersection points, then draws the boxes to represent
       the sections/boxes. Obviously #1, the creation of lines; and #2, the creation
       of intersections must be done for #3 the creation of sections/boxes can
       work.
```

Once the boxes are found, the classifier 150 is configured to execute code for the recognition of such box-shaped data fields via one or more steps that include analyzing each potential data field with a text recognition engine 140. For example, the recognition engine 140 is configured to recognize data in boxes using Optical Character Recognition (OCR) and produce multiline results. The recognition engine 140 goes through recognition results making sure that segmentation is correct by analyzing, for example, character size. If it is determined that the segmentation was not done properly, the recognition engine 140 narrows the recognition area down to improve segmentation and thus, improve recognition results. If the recognition engine 140 is able to further refine the recognition area, it will perform recognition again.

For example, the following is the pseudo code regarding the recognition of the data field.

4. Recognize the contents within the sections/boxes. By default it attempts to read W2's unless 1099 is chosen.

After the recognition is done, the classifier 150 is configured to execute code for the classification of each box by performing one or more of three matching operations, including a match between the recognition results and a predefined set of known labels for the identified form (i.e., the W-2 form and 1099 form), performing a match between the recognition results and a predefined set of known data formats (i.e., social security number formats), and/or performing a match between the labels and data formats, to classify and return the box label, coordinates and the recognition value of interest.

For example, the following is the pseudo code regarding the classification of the data field.

5. W2
   a. W2.LoadMatchesList( )
   b. W2Matches.xml
      i. It is first necessary to understand that the program requires a template of known fields to look for. As the image size, field size, field dimensions, field locations and font might change the field labels of what that section/box is representing will stay the same.
      ii. The xml file is broken down into each of those fields by declaring:
         1. Number - usually a number but can be a string as well. Ex: 2
         2. Name - the entire contents of what the label is. Ex: 2 Fed income tax withheld.
         3. MijField - used for internal purposes for storing data
         4. DefaultValue - value if not found
         5. Matching - sub matches within the name to find
            a. Name - sub match name to find. Ex: FED, TAX
            b. AdditionalMatch
               i. Match - Will also be accepted. Ex: ED, AX
               ii. StartPos - starting position of the additional match
               iii. Length - the length of the additional match
               iv. Weight - the weight of the additional match
            c. StartPos - starting position of the match
            d. Length - length of the match
            e. Weight - weight of the match
   c. The function iterates through the XML and creates objects in memory that represent this XML structure.
   d. Declaration of ImageTools.RecogBoxes object and ImageTools.RecogBoxes.GetRecResult(file, imageWidth, imageHeight, imageDPI, ListLinePoints/BoxList, BuildFields/true, splitLines, UpperCase/true) is called.
      i. Creates a file named from file but with a .zon extension called FormFile.
      ii. this.OMCreateFormFile(ListLinePoints/BoxList, FormFile, file, imageWidth, imageHeight, BuildFields/true) is called
         1. Creates a Nuance.OmniPage.CSDK.RECERR object called rec
            a. Calls the static function RecAPI.kRecSetImgRotation(0, IMG_ROTATE.ROT_NO)
               i. Assuming this means it won't automatically rotate the image??
            b. Calls the static function RecAPI.kRecLoadImgF(0, FormFile, out oPage, 0)
               i. Assuming this is loading the file into memory
            c. Calls the static function RecAPI.kRecProcessImg(0, oPage)
               i. Have no idea
         2. If rec ever returns an error an exception is thrown.
         3. Iterates through each of the ListLinePoints/BoxList.
            a. Creates a Nuance.OmniPage.CSDK.ZONE object called zon
            b. Creates a Nuance.OmniPage.CSDK.RECT object called rect with the BoxList dimension attributes.
            c. Sets zon.rectBBox = rect
            d. Calls static function RecAPI.kRecInsertZone(oPage, IMAGEINDEX.II_CURRENT, zon, i)
               i. Assuming this inserts the zone into memory?? But not sure where.
         4. Calls static function RecAPI.kRecSaveZones(oPage, FormFile)
            a. Assuming this saves the zones into the FormFile.zon file
      iii. this.OMRecogImg(FormFile, File, UpperCase/true) is called and returns a OMImgResult object which contains a List of ImgResult Fields.
         1. Static call of RecAPI.kRecLoadImgF(0, File, out oPage, 0)
            a. Assuming this loads the image file.
         2. Static call of RecAPI.kRecProcessImg
            a. Assuming this loads the image pixels into memory.
         3. Static call of RecAPI.kRecLoadZones(oPage, FormFile)
            a. Assuming this loads the zones
         4. Static call of RecAPI.kRecRecognize(0, oPage, null)
            a. Assuming this recognizes the fields within the zones.
         5. Static call of RecAPI.kRecGetOCRZoneCount(oPage, out Count)
         6. Iteration through all the zones from i = 0 to Count, i++
            a. Local declaration of Nuance.omniPage.CSDK.ZONE called Zone
            b. Static call of RecAPI.kRecGetOCRZoneInfo(oPage, IMAGEINDEX.II_CURRENT, out Zone, i)
            c. Static call of RecAPI.kRecGetOCRZoneFormFieldName(oPage, i, out fieldname)
            d. Local call to this.Convert2Result( . . . ) which converts the information found into a OMFieldResult and adds it to the list of fields to be returned.
      iv. The program iterates through the ImageResult fields and adds the appropriate field information to a global List of BoxItems, which is an ImageTools object that has various members to keep track of the section it came from, name, confidence, List of line items etc.
      v. Deletes the .zon file
   e. Declaration of a new W2 object is declared and GetW2Res( ) is called
      i. Iterates through each Box item list representing the XML boxes and finds the information inside the list of field results to display information in the panel.
6. 1099 labels
   a. 1099.LoadMatchesList( )
   b. 1099Config.xml
      i. Similar to the W2Matches.xml the program requires a template of known fields to look for. As the image size, field size, field dimensions, field locations and font might change the field of what that section/box is representing will stay the same.
      ii. However this file doesn't contain the field information but the names of other xml config files that does contain the field information.
      iii. The data is a simple configuration file that has a root note of FormsList and sub nodes named Form.
         1. All of the Form subnodes only have one property called Name. Ex: Form name="1099B"
      iv. All of the "FormName"Matches.xml files match the same template as the W2Matches.xml, refer to #5.b
   c. Loads the Formnames to then load "FormName" Matches.xml files.
      i. It traverses through the XML and creates objects in data that represent this XML structure, Dictionary<string, List<BoxMatches>>.
   d. It ensures that the selected index exists in the dictionary just created by LoadMatchesList( )
   e. Does the same call as 5.d GetRecResult( . . . )
   f. Declares a new instance of T1099 called Result and calls Result.GetRes(ListOfBoxes, Selected1099Form)
      i. Based on which Selected1099Form has been inputted certain attributes are declared to search for specific box attributes within the XML.

-continued ii. Iterates through the list of Box items and adds the box to the global Dictionary<string, List<BoxItem>>if the box exists within the XML and is valid.
 g. Iterates through the box item list and outputs the data to a "FileName" Raw.txt file and displays the information on the panel.

In a first exemplary operation, the classifier 150 is configured to execute code for the classification of each box by performing a match between recognition results and a predefined set of known labels, such as labels stating "Employer's FED ID Number", "Employee's SSA Number", and "Wages, tips, other comp." etc. This can be used by the classifier 150 to identify the form, identify the box, and/or identify the box contents. These exemplary labels are those found on a W-2 but embodiments are not limited thereto. The predefined set of known labels can be stored on a memory 160, and accessed by the classifier 150. Periodic updates can be provided to the database, and/or the database can be updated on an ongoing basis as new labels are detected by the system.

In a second exemplary operation, the classifier 150 can also classify each box by performing a match between recognition results and a predefined set of known data formats (i.e., social security number formats). Specifically, the classifier 150 can classify each box by performing a match between recognition results and a predefined set of known data formats, such as a format of nine digits "xxx-xx-xxxx" for a Social Security Number. This can be used by the classifier 150 to identify the form, identify the box, and/or identify the box contents. The predefined set of known data formats can be stored on the memory 160, and accessed by the computer code and/or software. Periodic updates can be provided to the database, and/or the database can be updated on an ongoing basis as new formats are detected by the system.

In a third exemplary operation, the classifier 150 can also classify each box by performing a match between the labels described above (i.e., "Employer's FED ID Number", "Employee's SSA Number", and "Wages, tips, other comp." etc.) and data formats described above (i.e., xxx-xx-xxxx for a Social Security Number). This can be used by the classifier 150 to identify the form, identify the box, and/or identify the box contents. The classifier 150 is configured to perform one or more of the exemplary operations as needed. For example, the classifier 150 can perform the first operation and if a satisfactory result is achieved, can move on. If a satisfactory result is not achieved, the classifier 150 can perform the second operation and so forth. Further, the classifier 150 can be configured to identify and perform one of the three operations based on a likelihood of success, and bypass the remaining operations. Still further, the user can configure parameters of the comparisons performed above to set degrees of matching between data that indicate a successful comparison. In cases where external databases such as SSN, EIN, or Postal codes are available, the recognition results can be improved further for capturing non-numeric data using such external databases for comparison.

The classifier 150 is also configured to execute code to associate the coordinates of where the data was captured and assign a confidence level of how well it was able to find and\or recognize the data. All of this information is used to create and update a metadata file stored to the memory 160, and accessed by the computer code and/or software. Depending upon the estimated or determined accuracy of the data capture, the data can be stored to the memory 160 or sent to a data entry operator to perform online data confirmation.

If the classifier 150 is able to successfully classify the box, results (i.e., box label, coordinates and the recognition value) are returned. For example, the system and method can provide data including boxes and box labels that were identified, and boxes and box labels that may contain data of interest. The system and method can further provide coordinates of boxes. Finally, the system and method can provide the recognition values, or data, of the box that may be of interest. The system and method can provide any number of additional processing results, such as the comparison used to classify the box. To do so, the exemplary embodiments of the present invention can include a display or printer that can provide such results to a user. The data can also be uploaded to another subsystem which can execute computer code and/or software for data mining and data matching to ensure compliance or other confirmation checks such as, for example, to ensure that the input user, a taxpayer in this example, correctly declared all of their income.

FIG. 3 is a flow chart of a method 500 illustrating steps in a process according to an exemplary embodiment of the present invention. In one exemplary use, a user may provide source documents in either hard or soft form. If in hard form, the machines 110 can be used to convert the hard copy document into a soft copy format for text/data extraction in step 510. The document received in or converted to electronic form, for example in pdf, tif, gif, jpeg, bit-map or HTML format, can be delivered to the processor 120 for processing in step 520. The processor 120 is configured to perform operations on the electronic document, such as data field identification, classification and text/data extraction. The processor 120 includes software or processes that can identify data fields, classify data fields, and extract data, all from the electronic form.

Specifically, the processor 120 comprises the data field identifier 130 to first identify data fields or similar visually-identifiable data containment locations on the form that appear as a line, a rectangle or a box-shaped field in step 520. In the case of a box-shaped field presented for example, the data field identifier 130 uses one or more of vertical and horizontal lines found on the form, and the intersections thereof, to identify boxes on the scanned forms. The data field identifier 130 builds vertical and/or horizontal lines from a bitmap and then finds the intersections of the vertical and/or horizontal lines. Once intersections are determined, the data field identifier 130 defines rectangular areas (i.e., boxes) on the scanned forms using the identified intersections. At this point, each set of rectangular areas are identified, and further steps are performed to identify rectangular areas that potentially have data of interest.

The processor 120 also comprises the classifier 150 to then classify box-shaped data fields via one or more steps that include analyzing each potential data field with a text recognition engine 140 in step 530. For example, the recognition engine 140 is configured to recognize data in boxes using Optical Character Recognition (OCR) and produce multiline results. The recognition engine 140 goes through recognition results making sure that segmentation is correct by analyzing, for example, character size in step 540. If it is determined that the segmentation was not done properly, the recognition engine 140 narrows the recognition area down to improve segmentation in step 550 and thus, improve recognition results. If the recognition engine 140 is able to further refine the recognition area, it will perform recognition again at step 530.

After the recognition is done, the classifier 150 classifies each box by performing one or more of three matching operations in step 560, including a match between the recognition results and a predefined set of known labels for the identified form (i.e., the W-2 form and 1099 form), performing a match between the recognition results and a predefined set of known data formats (i.e., social security number formats), and/or performing a match between the labels and data formats, to classify and return the box label, coordinates and the recognition value of interest.

In step 560, the classifier 150 can classify each box by performing a match between recognition results and a predefined set of known labels, such as labels stating "Employer's FED ID Number", "Employee's SSA Number", and "Wages, tips, other comp." etc. This can be used by the classifier 150 to identify the form, identify the box, and/or identify the box contents. These exemplary labels are those found on a W-2 but embodiments are not limited thereto. The predefined set of known labels can be stored on a memory 160, and accessed by the classifier 150.

The classifier 150 can also classify each box by performing a match between recognition results and a predefined set of known data formats (i.e., social security number formats). Specifically, the classifier 150 can classify each box by performing a match between recognition results and a predefined set of known data formats, such as a format of nine digits "xxx-xx-xxxx" for a Social Security Number. This can be used by the classifier 150 to identify the form, identify the box, and/or identify the box contents. The predefined set of known data formats can be stored on the memory 160, and accessed by the computer code and/or software.

The classifier 150 can also classify each box by performing a match between the labels described above (i.e., "Employer's FED ID Number", "Employee's SSA Number", and "Wages, tips, other comp." etc.) and data formats described above (i.e., xxx-xx-xxxx for a Social Security Number). This can be used by the classifier 150 to identify the form, identify the box, and/or identify the box contents. The classifier 150 is configured to perform one or more of the exemplary operations as needed in step 560. For example, the classifier 150 can perform one classification operation and if a satisfactory result is achieved, can move on. If a satisfactory result is not achieved, the classifier 150 can perform a second classification operation and so forth in step 560. Further, the classifier 150 can be configured to identify and perform one of the three operations based on a likelihood of success, and bypass the remaining operations in step 560.

If the classifier 150 is able to successfully classify the box, results (i.e., box label, coordinates and the recognition value) are returned at step 570. For example, the system and method can provide data including boxes and box labels that were identified, and boxes and box labels that may contain data of interest. The system and method can further provide coordinates of boxes. Finally, the system and method can provide the recognition values, or data, of the box that may be of interest. The system and method can provide any number of additional processing results, such as the comparison used to classify the box. To do so, the exemplary embodiments of the present invention can include a display or printer that can provide such results to a user. The data can also be uploaded to another subsystem which can execute computer code and/or software for data mining and data matching to ensure compliance or other confirmation checks such as, for example, to ensure that the input user, a taxpayer in this example, correctly declared all of their income.

The foregoing embodiments and advantages are merely exemplary and are not to be construed as limiting the present invention. The present exemplary teachings can be readily applied to other types of apparatuses. Also, the description of the embodiments of the present invention is intended to be illustrative, and not to limit the scope of the invention, and many alternatives, modifications, and variations will be apparent to those skilled in the art without departing from the spirit and scope of the invention.

What is claimed is:

1. A computer-implemented method for data identification and extraction from a form, the method comprising:
   controlling a scanner to scan a paper text form comprising data containment locations and data therein;
   controlling a data field identifier of a processor spatially separated from said scanner to identify one or more of vertical and horizontal lines found on said form, and intersections thereof to identify data containment locations on said form;
   controlling a recognition engine of said processor to identify data in said data containment locations on said form;
   controlling a classifier of said processor to classify each of said data containment locations by performing a match between a first data of said data containment locations and a second data; and
   controlling said processor to identify data containment locations of interest based on said classification and returning at least one of said identified data containment locations, identified data of said data containment locations, and said data of said data containment locations of interest, via a display or printer.

2. The method of claim 1, further comprising:
   scanning said form and converting data of said form into an electronic format.

3. The method of claim 1, further comprising:
   building said vertical and horizontal lines from a bitmap; and
   finding intersections of said vertical and horizontal lines to identify data containment locations on said form.

4. The method of claim 1, further comprising:
   identifying data in said boxes through optical character recognition.

5. The method of claim 4, further comprising:
   confirming data identification accuracy by analyzing character size.

6. The method of claim 5, further comprising:
   narrowing a recognition area and repeat identifying data in said boxes through optical character recognition.

7. The method of claim 1, further comprising:
   classifying one of said data containment locations by performing a match between said first data of said data containment locations and said second data, wherein said second data comprises a predefined set of known labels for said form.

8. The method of claim 1, further comprising:
   classifying one of said data containment locations by performing a match between said first data of said data containment locations and said second data, wherein said second data comprises a predefined set of known data formats.

9. The method of claim 1, further comprising:
   classifying one of said data containment locations by performing a match between said first data and said second data, wherein said first data comprises a label for said form and said second data comprises a data format.

10. The method of claim 1, further comprising:
    storing said data in a database; and
    generating a form by populating a set of fields within said generated form with a set of stored data.

11. A computer-implemented method for data identification and extraction from a paper text document, the method comprising:

controlling a scanner for scanning a paper text document comprising data containment locations and data therein;

controlling a data field identifier of a processor spatially separated from said scanner to identify said paper text document and one or more data containment locations on said document;

controlling a recognition engine of said processor to identify data in said data containment locations on said document;

controlling a classifier of said processor to classify each of said data containment locations by performing one or more of a match between identification results and a predefined set of known labels, a match between identification results and a predefined set of known data formats, and a match between labels and data formats; and controlling said processor to identify data containment locations of interest based on said classification and returning at least one of said identified data containment locations, identified data of said data containment locations, and said data of said data containment locations of interest, via a display or printer.

12. The method of claim 11, further comprising:
identifying data in said data containment locations through optical character recognition;
confirming data identification accuracy by analyzing character size; and
if inaccurate, narrowing a recognition area and repeat identifying data in said data containment locations through optical character recognition.

13. The method of claim 11, further comprising:
storing said data in a database; and
generating a document by populating a set of fields within said generated document with a set of stored data.

14. A non-transitory computer-readable recording medium storing a computer program code for performing a method of data identification and extraction from a form, comprising:
code having executable instructions to control a computer having a memory, storage and a processor for performing data identification and extraction;
code having executable instructions to control a scanner to scan a paper text form comprising data containment locations and data therein;
code having executable instructions to control a data field identifier of said processor spatially separated from said scanner to identify one or more of vertical and horizontal lines found on said form, and intersections thereof to identify data containment locations on said form;
code having executable instructions to control a recognition engine of said processor to identify data in said data containment locations;
code having executable instructions to control a classifier of said processor to classify each of said data containment locations by performing a match between a first data of said data containment locations and a second data; and
code having executable instructions to control said processor to identify data containment locations of interest based on said classification and return at least one of said identified data containment locations, identified data of said data containment locations, and said data of said data containment locations of interest, via a display or printer.

15. The non-transitory computer-readable recording medium of claim 14, further comprising:
code having executable instructions to control said scanner having a memory, storage and a processor
to scan said form and convert data of said form into an electronic format.

16. The non-transitory computer-readable recording medium of claim 14, further comprising:
code having executable instructions to classify one of said data containment locations by performing a match between said first data of said data containment locations and said second data, wherein said second data comprises a predefined set of known labels for said form.

17. The non-transitory computer-readable recording medium of claim 14, further comprising:
code having executable instructions to classify one of said data containment locations by performing a match between said first data of said data containment locations and said second data, wherein said second data comprises a predefined set of known data formats.

18. The non-transitory computer-readable recording medium of claim 14, further comprising:
code having executable instructions to classify one of said data containment locations by performing a match between said first data and said second data, wherein said first data comprises a label for said form and said second data comprises a data format.

19. The non-transitory computer-readable recording medium of claim 14, further comprising:
code having executable instructions to store said data in a database; and
code having executable instructions to generate a form by populating a set of fields within said generated form with a set of stored data.

20. The non-transitory computer-readable recording medium of claim 15, wherein said scanner and said computer are spatially separated, further comprising:
a communication link between said spatially separated scanner and said computer.

* * * * *